(12) United States Patent
Funada et al.

(10) Patent No.: US 11,096,395 B2
(45) Date of Patent: Aug. 24, 2021

(54) FOOD DISCOLORATION INHIBITOR

(71) Applicant: Toray Industries, Inc., Otsu (JP)

(72) Inventors: Shigeyuki Funada, Kamakura (JP); Hiroyuki Kurihara, Otsu (JP); Katsushige Yamada, Kamakura (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 16/342,042

(22) PCT Filed: Oct. 26, 2017

(86) PCT No.: PCT/JP2017/038641
§ 371 (c)(1),
(2) Date: Apr. 15, 2019

(87) PCT Pub. No.: WO2018/079640
PCT Pub. Date: May 3, 2018

(65) Prior Publication Data
US 2019/0246655 A1    Aug. 15, 2019

(30) Foreign Application Priority Data

Oct. 27, 2016  (JP) .............................. JP2016-210700

(51) Int. Cl.
*A23B 4/20*      (2006.01)
*A23L 3/3472*   (2006.01)
(Continued)

(52) U.S. Cl.
CPC .................. *A23B 4/20* (2013.01); *A23B 4/00* (2013.01); *A23L 3/3472* (2013.01); *A23L 5/41* (2016.08);
(Continued)

(58) Field of Classification Search
CPC . A23L 5/41; A23L 13/40; A23L 17/00; A23L 3/3472; A23L 17/40
See application file for complete search history.

(56) References Cited

U.S. PATENT DOCUMENTS

2006/0034985 A1    2/2006  Higuchi

FOREIGN PATENT DOCUMENTS

| JP | 06-311842 A | 11/1994 |
| JP | 2005-41969 A | 2/2005 |

(Continued)

OTHER PUBLICATIONS

Khunsupat et al., "Molecular Weight Distribution of Lignin". Available online at http://biorefinery.utk.edu/pdf/Molecular_Weight_Distribution_of_Lignin.pdf on Sep. 7, 2013 (Year: 2013).*

(Continued)

*Primary Examiner* — Erik Kashnikow
*Assistant Examiner* — Assaf Zilbering
(74) *Attorney, Agent, or Firm* — DLA Piper LLP (US)

(57) ABSTRACT

A food discoloration inhibitor contains, as an effective ingredient, a low molecular weight lignin having a molecular weight peak in a molecular weight range of 4,000 to 9,500 and/or a high molecular weight lignin having a molecular weight peak in a molecular weight range of 10,000 to 40,000, wherein the molecular weight peak is measured at a wavelength of 254 nm by GPC molecular weight analysis using an UV detector.

8 Claims, 6 Drawing Sheets

(51) Int. Cl.
*A23L 5/41* (2016.01)
*A23L 17/40* (2016.01)
*A23L 17/00* (2016.01)
*A23L 13/40* (2016.01)
*A23B 4/00* (2006.01)

(52) U.S. Cl.
CPC .............. *A23L 13/40* (2016.08); *A23L 17/00* (2016.08); *A23L 17/40* (2016.08); *A23V 2002/00* (2013.01)

(56) References Cited

FOREIGN PATENT DOCUMENTS

JP 2006177434 A * 7/2006
JP 2008-5724 A 1/2008

OTHER PUBLICATIONS

Nirmal, N.P. et al., "Effect of Ferulic Acid on Inhibition of Polyphenoloxidase and Quality Changes of Pacific White Shrimp (*Litopenaeus vannamei*) During Iced Storage." *Food Chemistry*, 116(1):323-331, Sep. 1, 2009. http://www.sciencedirect.com/science/article/pii/S0308814609002428. Abstract Only.

Tolbert, A. et al, "Characterization and Analysis of the Molecular Weight of Lignin for Biorefining Studies." *Biofuels, Bioproducts and Biorefining*, 8 (6):836-856, 2014, http://onlinelibrary.wiley.com/doi/abs/10.1002/bbb.1500. Abstract Only.

Feiner, G., "Meat products handbook: practical science and technology, Passage" Jan. 1, 2006, *Meat Products Handbook: Practical Science and Technology*, CRC Press, Boca Raton, FLA, pp. 89-139, XP002657451.

Catignani, G.L. et al., "A Research Note Antioxidant Properties of Lignin", Jan. 1, 1982, Retrieved from the Internet: URL:https://onlinelibray.wiley.com/doi/pdfdirect/10.11114/j, pp. 1365-2621 [retrieved on Feb. 6, 2020] XP055665891.

The Extended European Search Report dated Feb. 17, 2020, of counterpart European Application No. 17865190.7.

Examination Report dated May 21, 2021, of counterpart Indian Application No. 201947018168 with English translation.

Jonglertjunya, W. et al., "Properties of Lignin Extracted from Sugarcane Bagasse and Its Efficacy in Maintaining Postharvest Quality of Limes during Storage," *LWT-Food Science and Technology*, vol. 57, 2014, pp. 116-125.

Kumar, N. et al., "Potential Applications of Ferulic Acid from Natural Sources," *Biotechnology Reports*, vol. 4, 2014, pp. 86-93.

* cited by examiner

FOOD DISCOLORATION INHIBITOR

TECHNICAL FIELD

This disclosure relates to food discoloration inhibitors.

BACKGROUND

Food reacts with oxygen in the air and, thus, becomes dark in color or discolored during processing and storage, resulting in having lower quality. In the past, kojic acid was used as a discoloration inhibitor against food discoloration, but is now prohibited because kojic acid was suspected of causing cancer. As substitutes for kojic acid, sulfites such as sodium hyposulfite, sodium hydrogen sulfite, and sodium pyrosulfite are now used, but have an unfavorable impact on the human body, and the Food Sanitation Law of Japan regulates the residual concentration of sulfite for each kind of food. For example, the residual concentration of sulfite in terms of the residual amount of sulfur dioxide is less than 5.0 g/kg for kampyo gourds, less than 1.5 g/kg for raisins, less than 0.35 g/kg for fruit liquor or miscellaneous liquor, less than 0.1 g/kg for shucked prawn meat or shucked frozen raw crab meat, and less than 0.030 g/kg for food that is not particularly designated.

On the other hand, food discoloration inhibitors that are naturally-derived and safer are under study. For example, it is known that a ferulic acid contained in plant cell walls and the like has a discoloration inhibition effect, and Nirmal, N. P. et al., *Food Chemistry*, 116, 323-331 (2009) states that dipping *Litopenaeus vannamei* shrimp in a solution containing a ferulic acid suppresses polyphenol oxidase activity suppression and suppresses browning. However, to exhibit the same browning suppression effect as sulfite, the solution needs to have a ferulic acid concentration of 1.0 wt % (10,000 ppm, 0.7 wt % in terms of catechin) or more, and this is problematic in that the production of a high concentration ferulic acid is costly.

Furthermore, JP 06-377842A describes a method in which sugar cane squeezed juice, sucrose derived from sugar cane, or cellobiose is used as a black-discoloration inhibitor for crustaceans.

It could therefore be helpful to provide a food discoloration inhibitor that is naturally-derived and safe.

SUMMARY

We found that a low molecular weight lignin having a molecular weight peak in a molecular weight range of 4,000 to 9,500 and/or a high molecular weight lignin having a molecular weight peak in a molecular weight range of 10,000 to 40,000 have/has a food discoloration inhibitor effect in place of sulfites, wherein the molecular weight peak is measured at a wavelength of 254 nm by GPC molecular weight analysis using an UV detector.

We thus provide:

(1) A food discoloration inhibitor, containing, as an effective ingredient, a low molecular weight lignin having a molecular weight peak in a molecular weight range of 4,000 to 9,500 and/or a high molecular weight lignin having a molecular weight peak in a molecular weight range of 10,000 to 40,000, wherein the molecular weight peak is measured at a wavelength of 254 nm by GPC molecular weight analysis using an UV detector.

(2) The food discoloration inhibitor according to (1), containing, as an effective ingredient, a composition containing the low molecular weight lignin and/or the high molecular weight lignin having a molecular weight peak in a molecular weight range of 10,000 to 40,000, wherein the lignin(s) content as a polyphenol amount is 0.05 wt % or more in terms of catechin.

(3) The food discoloration inhibitor according to (2), containing, as an effective ingredient, the composition further containing a coumaric acid and/or a ferulic acid.

(4) The food discoloration inhibitor according to (2) or (3), wherein the composition is a bagasse alkaline hot-water extract.

(5) The food discoloration inhibitor according to any one of (1) to (4), wherein the food is a fresh food.

(6) The food discoloration inhibitor according to (5), wherein the fresh food is an aquatic organism.

(7) The food discoloration inhibitor according to (6), wherein the aquatic organism is a crustacean.

(8) The food discoloration inhibitor according to (7), wherein the crustacean is a prawn.

(9) A method of inhibiting food discoloration, including bringing the food discoloration inhibitor into contact with food.

The food discoloration inhibitor is a highly safe naturally-derived discoloration inhibitor, and has a discoloration inhibition effect that is the same as or greater than sulfites used as a food discoloration inhibitor have.

DETAILED DESCRIPTION

Examples of our inhibitors will be described in detail.

Lignins are high molecular weight phenolic compounds derived from plants. Lignins have complicated and various structures, the details of which have not been clarified. In addition, although the molecular weights of lignins vary with the type of biomass, the extraction method, and the analysis method, the general number average molecular weights that have been reported are 2400 to 9700 (*Biofuels Bioproducts & Biorefinering*, Volume 8, Issue 6, 836-856 (2014)).

Our food discoloration inhibitor contains, as an effective ingredient, a low molecular weight lignin having a molecular weight peak in a molecular weight range of 4,000 to 9,500 and/or a high molecular weight lignin having a molecular weight peak in a molecular weight range of 10,000 to 40,000, wherein the molecular weight peak is measured at a wavelength of 254 nm by GPC molecular weight analysis.

The low molecular weight lignin has a molecular weight peak in a molecular weight range of preferably 4,500 to 9,400, more preferably 5,000 to 9,300.

The high molecular weight lignin has a molecular weight peak in a molecular weight range of preferably 10,200 to 37,000, more preferably 11,000 to 35,000.

In addition, the molecular weight of a lignin can be judged based on the number average molecular weight. The low molecular weight lignin has an average molecular weight of preferably 3,500 to 6,000, more preferably 3,600 to 5,000, wherein the average molecular weight is a number average molecular weight measured by GPC molecular weight analysis using an UV detector. The high molecular weight lignin has an average molecular weight of preferably 10,000 to 20,000, more preferably 10,000 to 15,000, wherein the average molecular weight is a number average molecular weight measured by GPC molecular weight analysis using an UV detector. The lignin containing both a low molecular weight lignin and a high molecular weight lignin has an average molecular weight of preferably 4,000 to 15,000, more preferably 6,000 to 10,000, wherein the average molecular weight is a number average molecular weight measured by GPC molecular weight analysis using an UV detector.

In addition, the low molecular weight lignin and the high molecular weight lignin may have a plurality of molecular weight peaks as long as the peaks are in the above-mentioned molecular weight ranges. Furthermore, the lignins may have a molecular weight peak outside the above-mentioned molecular weight ranges and, in this example, it is preferable that the highest peak of the molecular weight peaks at a wavelength of 254 nm is in a molecular weight range of 4,000 to 9,500 for the low molecular weight lignin and in a molecular weight range of 10,000 to 40,000 for the high molecular weight lignin.

Figure 1:
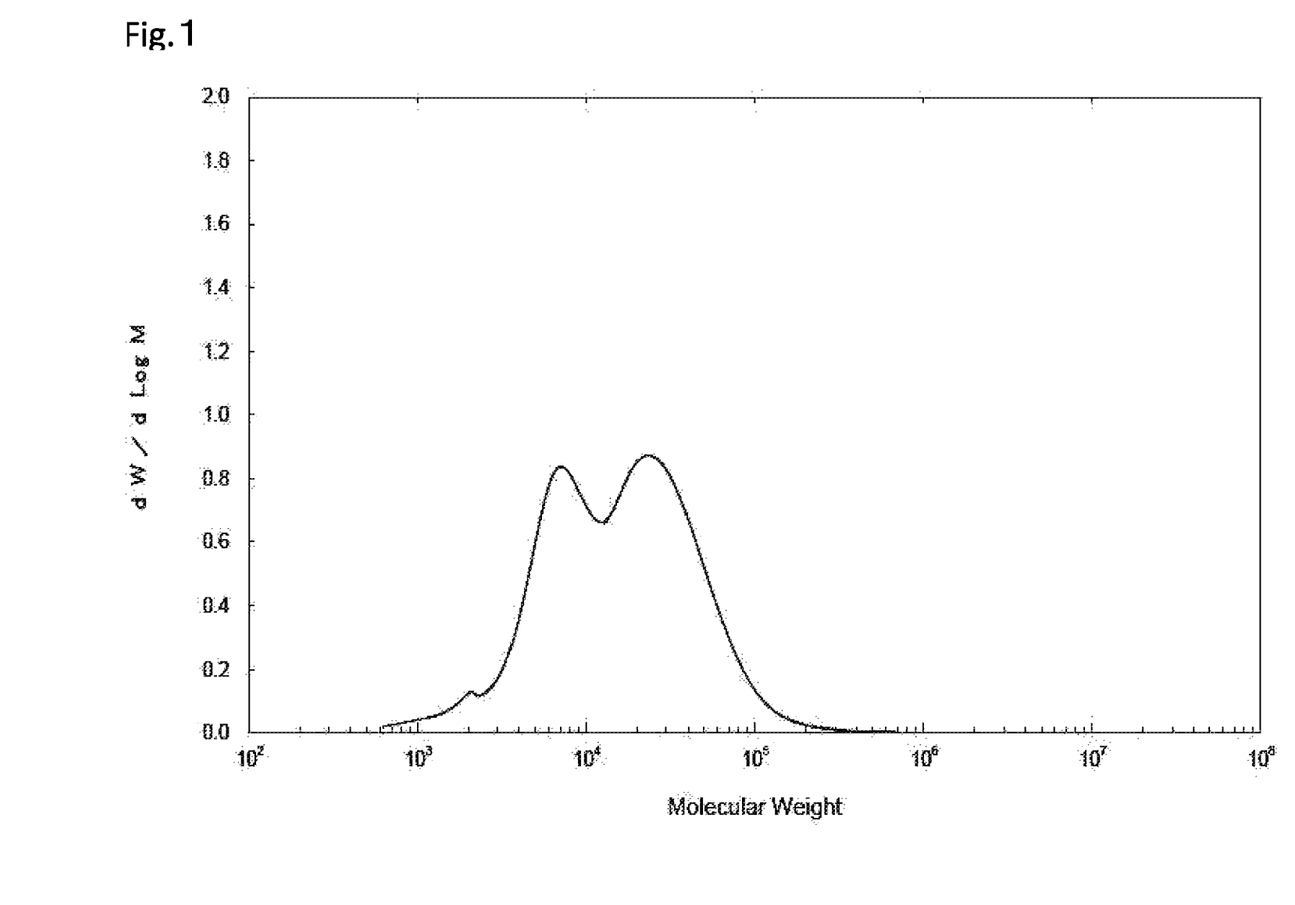
FIG. 1 shows a specific example of the GPC molecular weight analysis result of a low molecular weight lignin and a high molecular weight lignin.
Figure 2:
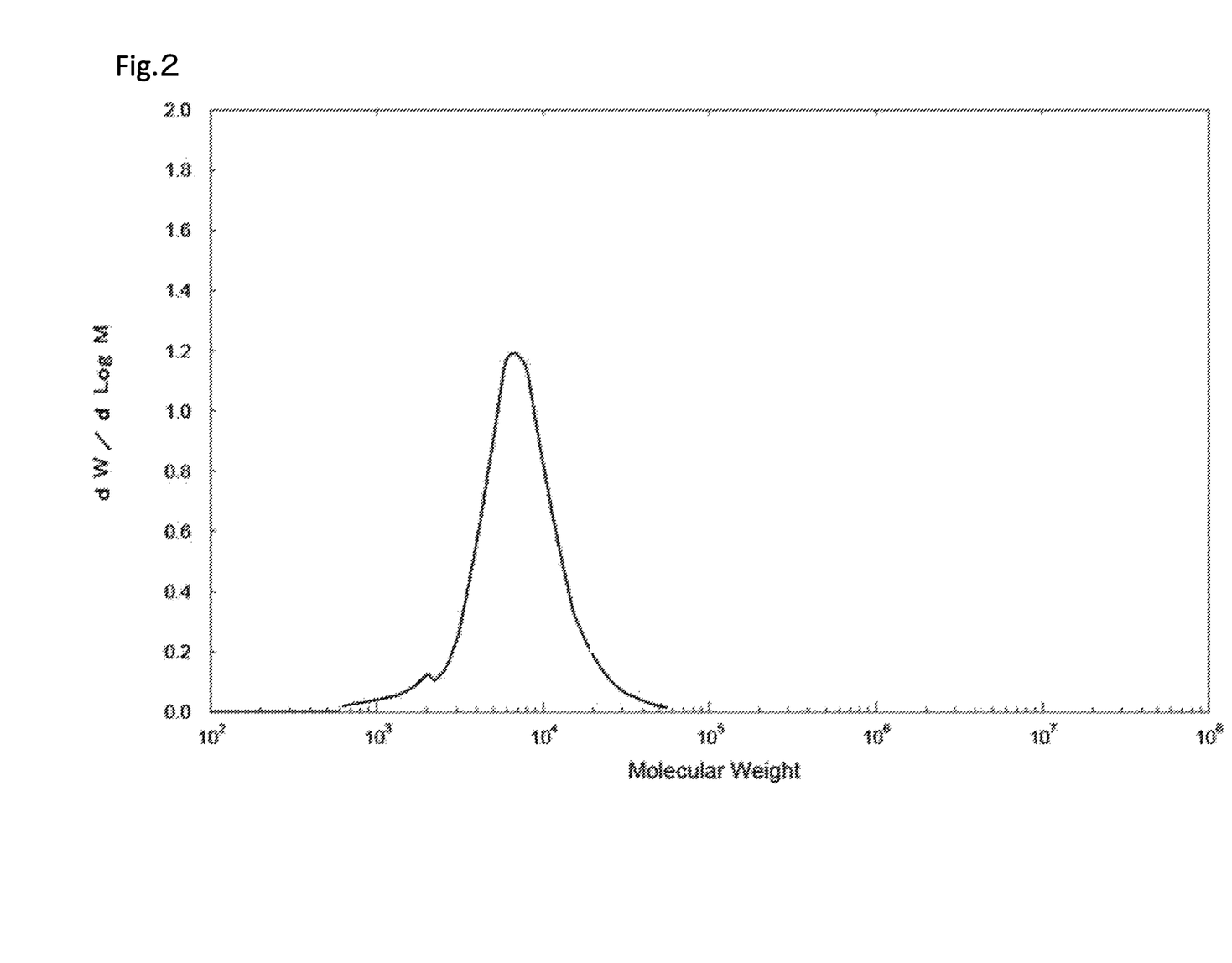
FIG. 2 shows a specific example of the GPC molecular weight analysis result of a low molecular weight lignin.
Figure 3:
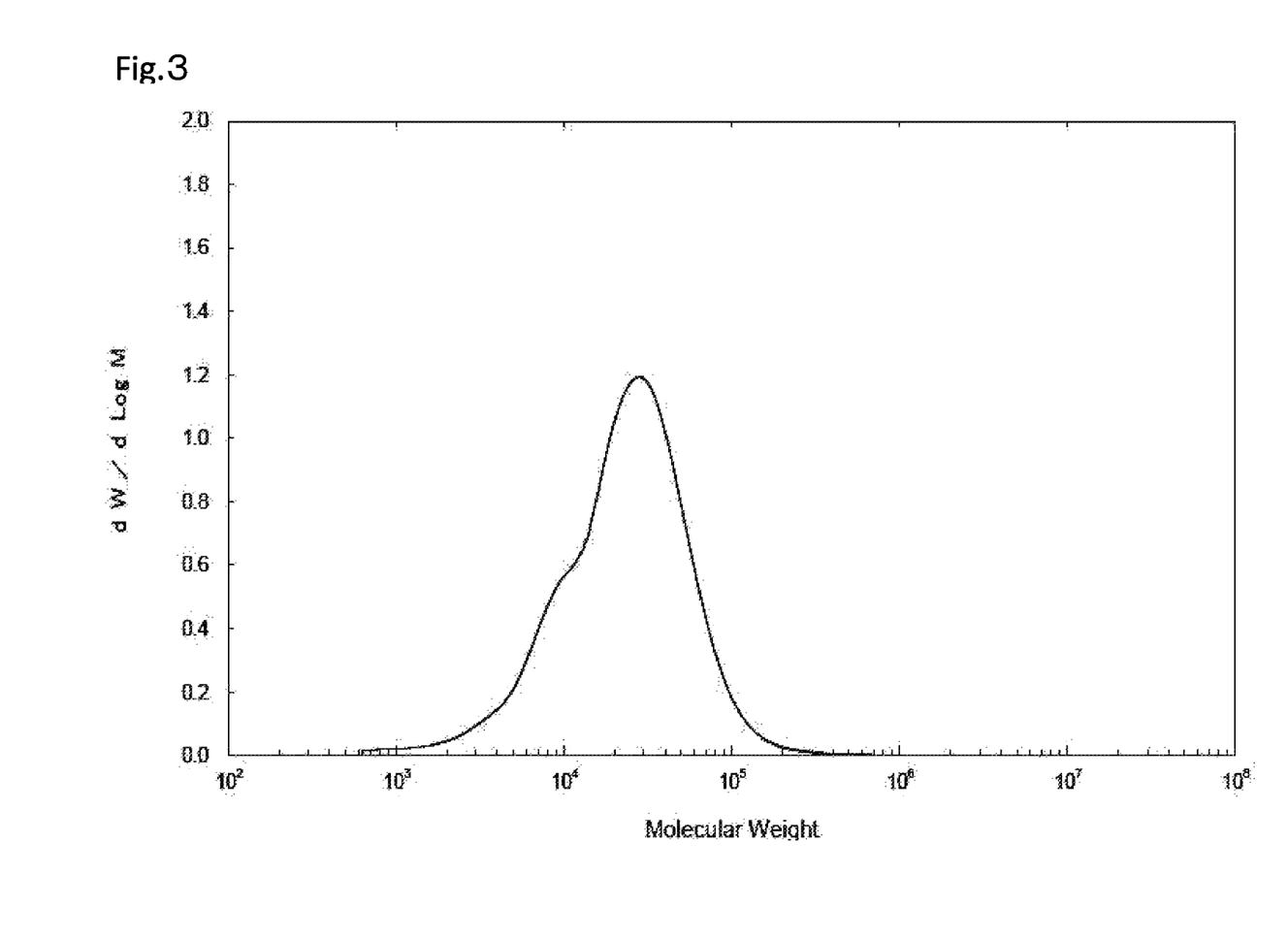
FIG. 3 shows a specific example of the GPC molecular weight analysis result of a high molecular weight lignin.

FIG. 1 shows a specific example of a GPC molecular weight analysis performed using an UV detector on a lignin containing both a low molecular weight lignin and a high molecular weight lignin. In addition, FIG. 2 shows a specific example of a low molecular weight lignin, and FIG. 3 shows a specific example of a high molecular weight lignin.

Hereinafter, a low molecular weight lignin is referred to as the "low molecular weight lignin", and a high molecular weight lignin is referred to as the "high molecular weight lignin".

GPC is an abbreviation of Gel Permeation chromatography, and enables compounds in a measurement sample to be separated in accordance with the molecular size. In addition, detecting the relative amounts of the separated polymers using a detector enables the molecular weights to be calculated. In a GPC molecular weight analysis, a standard polymer is used to preliminarily determine the relationship between the elution time and the molecular weight, on the basis of which relationship, the molecular weight of a measurement sample is calculated. The molecular weights of the low molecular weight lignin and the high molecular weight lignin are values measured using polyethylene glycol and polyethylene oxide as standard polymers.

As a detector for GPC molecular weight analysis, a detector capable of detecting the absorption wavelength region of lignin from 250 to 300 nm can be used. Values measured at 254 nm at which cinnamic acids have no absorption were used in a GPC molecular weight analysis to eliminate the impact of cinnamic acids such as a coumaric acid and a ferulic acid that are low molecular weight aromatics. Values for the lignin were detected using a multiple wavelength ultraviolet-visible absorption detector (SPD-M20A) made by Shimadzu Corporation. Number average molecular weights can be calculated using Equation (1) from the molecular weights obtained by GPC molecular weight analysis. In Equation (1), Mn represents a number average molecular weight, M represents a molecular weight, N represents the number of polymers, and C represents a sample concentration.

$$Mn = \Sigma(Mi \cdot Ni)/\Sigma(Ni) = \Sigma Ci/\Sigma(Ci/Mi) \quad (1)$$

A column to be used for GPC molecular weight analysis is not limited to any particular one, and TSKgelGMPW$_{XL}$ and G2500PW$_{XL}$ were used to measure molecular weight values.

Examples of plants that can be used as raw materials for the low molecular weight lignin and/or the high molecular weight lignin include: conifers such as pine, cedar, and cypress; broadleaf trees such as *eucalyptus* and acacia; herbaceous biomass such as bagasse that is the sugar cane residual left after the juice is extracted, switchgrass, napier grasses, erianthus, corn stover, rice straw, and wheat straw; biomass derived from the aquatic environment such as algae and sea grasses; cereal hull biomass such as corn hulls, wheat hulls, soya bean hulls, and chaff; and the like. Bagasse is preferable.

Examples of methods of extracting the low molecular weight lignin and/or the high molecular weight lignin from the plants include extraction with an organic solvent (ethanol, ethyl acetate, or the like), acid extraction, alkaline extraction, hydrothermal extraction, alkaline hydrothermal extraction, alkaline hot-water extraction, and the like. Alkaline extraction or alkaline hot-water extraction is preferable, and alkaline hot-water extraction is more preferable.

Examples of alkaline compounds to be used for alkaline extraction, alkaline hydrothermal extraction, or alkaline hot-water extraction include, but are not particularly limited to, sodium hydroxide, potassium hydroxide, calcium hydroxide, magnesium hydroxide, ammonia, and the like. Sodium hydroxide and potassium hydroxide are preferable, and sodium hydroxide is more preferable.

For alkaline hot-water extraction, reaction conditions are preferably a pH of 10 to 13.5, a temperature of 80° C. to 120° C., and for 0.5 hours or more, more preferably a pH of 10.5 to 13.0, a temperature of 90° C. to 120° C., and for one hour or more. The upper limit of the alkaline concentration is not limited to a particular one as long as the concentration enables the food discoloration inhibitor to be obtained. An alkaline concentration that is too high to biomass causes the lignin to have a lower molecular weight, and accordingly causes problems that effective ingredients for the food discoloration inhibitor cannot be obtained, and that coloring ingredients are generated in large amounts and color food to be processed. For example, sodium hydroxide is preferably 40 g/L or less.

A hydrothermal treatment is a method of extracting lignin by treatment with pressurized hot-water (180 to 240° C.).

An alkaline hydrothermal extraction is a method of extracting lignin by treatment with pressurized hot-water (180 to 240° C.) under a pH condition of alkaline hot-water extraction.

Specific examples of alkaline hot-water extraction methods include a method in which the low molecular weight lignin and/or the high molecular weight lignin can be extracted by allowing a solution having a bagasse concentration of 50 g/L (dry weight) to react with a 0.45 (wt/wt) % sodium hydroxide aqueous solution at 90° C. for two hours. The dry weight is a weight obtained after the bagasse is dried at 105° C. until the bagasse has a constant weight.

When it is desired to separate the low molecular weight lignin from the high molecular weight lignin, allowing the lignin mixture to be neutralized to pH 5 or less and undergo solid-liquid separation can separate the low molecular weight lignin as a liquid fraction from the high molecular weight lignin as a solid fraction. This is because it is characteristic of the low molecular weight lignin to dissolve in water under a pH 5 condition and it is characteristic of the high molecular weight lignin to deposit in water without dissolving. The high molecular weight lignin that is insolubilized under a pH 5 condition can then be dissolved in water at a pH made more alkaline than pH 5, for example, pH 8 or more.

The amount of the low molecular weight lignin and/or the high molecular weight lignin contained in the food discoloration inhibitor is preferably 0.05 wt % or more as the amount of polyphenol in terms of catechin. The amount is more preferably 0.1 wt % or more, most preferably 0.128 wt % or more. The upper limit of the polyphenol amount is not limited to a particular one in achieving the food discoloration inhibitor effect, and is preferably 2 wt % or less in that, when another brown ingredient is mixed together and when the polyphenol concentration is adjusted to a large value by concentration or the like, the mixed brown ingredient gets adhered to food and changes the appearance and flavor of the food. When the food discoloration inhibitor is used as a solution, the inhibitor can be used after being adjusted to have a concentration in the above-mentioned range. When the inhibitor is kneaded into food, the inhibitor is preferably used after being adjusted so that the weight ratio to food can be in the above-mentioned range.

The polyphenol amount in terms of catechin is a value calculated using the Folin-Chiocalteu method. The Folin-Chiocalteu method was originally developed to analyze aromatic amino acids such as tyrosine and tryptophan, and proteins having these. It is a method in which a phenolic hydroxyl group, which is alkaline, reduces phosphotungstic acid or molybdic acid, and the generated blue color is quantitated by colorimetry at 700 to 770 nm. The same operation can be carried out using a specific reference material such as gallic acid or catechin, and quantitative values can be indicated in terms of the compound. Values in terms of catechin are used.

The food discoloration inhibitor has a food discoloration inhibition effect. Discoloration to be inhibited by the food discoloration inhibitor refers to a change from a natural color tone to brown in a process in which food is preserved. Color is important as an index to determine freshness, and discoloration inhibition can enhance the quality and commodity value of food.

A food to which the food discoloration inhibitor is applied is not limited to a particular one as long as it is a food whose color changes during preservation, and is preferably fresh food. A fresh food is a food that is not completely heated, and may be a food a part of which such as the surface, is heated, but is preferably an unheated food. An unheated food refers to a food that is preserved at room temperature (30° C.) or less after the food is produced or harvested. A completely heated food is a food the central part of which is heated at a temperature of 75° C. or more for one minute or more.

Examples of fresh foods include cut foods, foods made by mixing a plurality of foods that have been cut into pieces, and seasoned foods, and unseasoned foods are preferable.

Specific examples of fresh foods include: crustaceans such as prawns and crabs; meats such as beef, pork, and chicken; fishes such as tuna, salmon, trout, bonito, sardines, Pacific sauries, horse mackerel, Pacific sauries, yellowtail, cod, Atka mackerel, bream, sand lances, pufferfishes, octopuses, and squid; vegetables such as cabbage, lettuce, spinach, eggplant, cucumber, onions, okra, and potatoes; fruits such as apples, bananas, persimmons, peaches, and avocados; and the like. Crustaceans such as prawns and crabs, minced meats, tuna, cabbage, and apples are preferable.

Specific examples of crustaceans include Bathysquillidae, Gonodactylidae, Odontodactylidae, Harpiosquillidae, Squillidae, Aristeidae, Solenoceridae, Penaeidae, Sicyoniidae, Sergestidae, Oplophoridae, Atyidae, Pasiphaeidae, Eugonatonotidae, Palaemonidae, Alpheidae, Hippolytidae, Pandalidae, Glyphocrangonidae, Crangonidae, Cambaridae, Astacidae, Nephropidae, Thaumastochelidae, Polychelidae, Palinuridae, Scyllaridae, Axiidae, Galatheoidae, Porcellanidae, Lithodidae, Potamonidae, Raninidae, Homolodromiidae, Dynomenidae, Latreilliidae, Homolidae, Dorippidae, Calappidae, Inachidae, Hymenosomatidae, Parthenopidae, Cancridae, Leucosiidae, Cheiragonidae, Corystidae, Portunidae, Geryonidae, Xanthidae, Goneplacidae, Ocypodidae, Grapsidae, Pinnotheridae, and the like. In particular, preferable examples among these are: *Panulirus japonicus* in Palinuridae; Ibacus, *Parribacus japonicus*, and *Scyllarides squamosus* in Scyllaridae; *Penaeus monodon, Litopenaeus vannamei* (white tiger prawn), *Marsupenaeus japonicus, Metapenaeus joyneri, Metapenaeopsis barbata, Litopenaeus vannamei* (whiteleg shrimp), *Penaeus semisulcatus* in Penaeidae; *Sergia lucens* in Sergestidae; *Pandalus borealis* and *Pandalus nipponensis* in Pandalidae; and *Nephropus japonicus* in Nephropidae.

In a method of using the food discoloration inhibitor, the low molecular weight lignin and/or the high molecular weight lignin may be used as a solution in which the lignin(s) are dissolved, or may be used as the lignin(s) solidified by concentration or drying. In a process of cooking food or in preserving food, the food may be dipped in the inhibitor, the inhibitor may be kneaded into food, the inhibitor may be applied to the surface of the food, or the inhibitor may be adhered to the food by spraying. Once the discoloration inhibitor has been in good contact with food, the effect of the inhibitor lasts even after the food is rinsed with water. When food such as vegetable, fruit, and meat, dipping the cut sides which contact oxygen, and hence which are susceptible to discoloration can suppress the discoloration. When food is a crustacean such as a prawn, dipping the whole food is effective, and has an effect of inhibiting the discoloration of the whole crustacean food.

A method of evaluating the discoloration suppression effect using the food discoloration inhibitor may be, for example, a method in which panelists evaluate the ratio of the discolored area by visual observation and compare the evaluation results with the food for which the food discoloration inhibitor has not been used. Specifically, the discolored areas can be rated at the following grades from 0 to 10, as described in Nirmal, N. P. et al., *Food Chemistry*, 116, 323-331 (2009). 0: no brown, 2: a brown ratio of 0% or more and less than 20%, 4: a brown ratio of 20% or more and less than 40%, 6: a brown ratio of 40% or more and less than 60%, 8: a brown ratio of 60% or more and less than 80%, 10: a brown ratio of 80% or more and 100% or less.

The food discoloration inhibitor may be a composition containing the low molecular weight lignin and/or the high molecular weight lignin and another ingredient. The another ingredient is not limited to a particular one as long as the ingredient does not inhibit a food discoloration inhibition action. It is known that a cinnamic acid derived from plants, particularly a coumaric acid and/or a ferulic acid, originally has a food discoloration inhibition action and, accordingly, using a coumaric acid and/or a ferulic acid together with the low molecular weight lignin and/or the high molecular weight lignin is expected to have the effect of increasing the food discoloration inhibition action.

A coumaric acid and a ferulic acid are known to have a food discoloration inhibitor effect, but need to have a concentration of 1.0 wt % or more in a liquid to achieve a discoloration inhibition effect for food which is dipped in the acids. However, addition of a coumaric acid and/or a ferulic acid at a high concentration will lower economical competitiveness. When the food discoloration inhibitor contains a coumaric acid and a ferulic acid, the composition contains preferably less than 1.0 wt % of coumaric acid and less than 1.0 wt % of ferulic acid, more preferably 0.04 to 0.5 wt % of coumaric acid and 0.008 to 0.5 wt % of ferulic acid. The concentrations of a coumaric acid and a ferulic acid can be quantitated by high performance liquid chromatography using a hydrophobic column and an UV detector.

In addition, a coumaric acid and a ferulic acid can be measured in the amount of polyphenol using the same method as the low molecular weight lignin or high molecular weight lignin. The composition preferably contains 0.0296 to 0.37 wt % of coumaric acid and 0.0064 to 0.4 wt % of ferulic acid as amounts of polyphenols in terms of catechin.

When the food discoloration inhibitor contains a coumaric acid and a ferulic acid, the amount of polyphenol contained in the food discoloration inhibitor is preferably 0.1 wt % or more, more preferably 0.2 wt % or more, in terms of catechin, including the low molecular weight lignin and/or the high molecular weight lignin.

The food discoloration inhibitor may contain an ingredient other than a coumaric acid and a ferulic acid as far as the ingredient does not inhibit the food discoloration inhibition effect.

The food discoloration inhibitor may be used as a solution in which the inhibitor is dissolved or as a solidified inhibitor. In a process of cooking food or in preserving food, the food may be dipped in the inhibitor, the inhibitor may be kneaded into the food, or the inhibitor may be adhered to the surface of the food. Once the food discoloration inhibitor has been in good contact with food, the effect of the food discoloration inhibitor lasts even after the food is rinsed with water.

EXAMPLES

Below, our inhibitors will be described specifically.

Reference Example 1 GPC Molecular Weight Analysis

GPC molecular weight analyses were carried out under the following conditions.
Detector: multiple wavelength ultraviolet-visible absorption detector UV (SPD-M20A made by Shimadzu Corporation, at a wavelength of 254 nm)
Column: TSKgelGMPW$_{XL}$ and G2500PW$_{XL}$, one each, tandemly-arranged (7.8 mm in diameter×30 cm, from Tosoh Corporation)
Solvent: ammonia buffer (pH 11)/methanol (1/1=v/v)
Flow Rate: 0.7 mL/min
Column Temperature: 23° C.
Injection Volume: 0.2 mL
Standard Sample: monodisperse polyethylene oxide and polyethylene glycol, made by Polymer Laboratories Ltd.
Using the standard sample, a relationship between elution time and logarithms of a molecular weight was obtained preliminarily, converted as a weight fraction per Log M (wherein M is a molecular weight), dW/dlogM (wherein W is a weight), and plotted with logarithms of the molecular weight as the abscissa against the ordinate such that the peak area corresponded to 1, followed by using the plot for analysis. The number average molecular weight was calculated using Equation (1).

Reference Example 2 Polyphenol Amount Measurement

The amount of polyphenol was measured under the following conditions using the Folin-Chiocalteu method. A suitably diluted measurement sample in an amount of 1.0 mL, 1.0 mL of a phenol reagent solution (from Nacalai Tesque, Inc.), and 5 mL of water were added to a 25 mL graduated flask and left to stand at room temperature for five minutes, and, to the resulting mixture, 10 mL of a 7% sodium carbonate aqueous solution was added. To the resulting mixture, water was further added to make up 25 mL, and mixed, and the resulting mixture left to stand at room temperature for two hours. Part of the reaction liquid was taken out, filtrated through a PTFE filter 0.45 μm in diameter, and measured for absorbance at 750 nm (the sample was suitably diluted such that the absorbance was 0.6 ABS or less). The measurement result was calculated in terms of catechin using a catechin reagent (from Sigma-Aldrich Co. LLC, having a purity of 98% or more) as a standard material. In the below-mentioned Test Examples, the results of polyphenol amounts measured in accordance with this Reference Example are shown in Tables 1 to 6. In the Tables, the mark "-" indicates that the catechin conversion cannot be carried out separately between our low molecular weight lignin/high molecular weight lignin and other lignins. The mark "0" in the Tables indicates that having no content is theoretically evident or that no value was detected in a measurement by the Folin-Chiocalteu method.

Reference Example 3 Aromatic Compound Measurement

The concentration of an aromatic compound such as a coumaric acid or a ferulic acid was measured under the following conditions.
Instrument: Hitachi high performance liquid chromatogram, LaChrom Eite
Column: Synergi 2.5 Hydro-RP100A 100×3.00 mm (Phenomenex)
Mobile Phase: 0.1% phosphoric acid:acetonitrile=93:7 to 5:95, gradient
Detector: Diode Array
Flow Rate: 0.6 mL/min
Temperature: 40° C.

Test Example 1 Discoloration Inhibition Effect on Shrimp (the Low Molecular Weight Lignin and the High Molecular Weight Lignin)

Bagasse in an amount of 1 kg (purchased from Taito Nosan K. K., produced in Vietnam) at 5 wt % by dry weight was added to and mixed with a 0.45 (wt/wt) % sodium hydroxide aqueous solution, the resulting mixture was allowed to react at 90° C. for two hours, and adjusted to pH 7 with 6 N hydrochloric acid, and then, the solid was separated through a sieve, and filtrated through an MF film (tradename: TREFIL HFS Type, made by Toray Industries, Inc.) to prepare a bagasse alkaline hot-water extract. This alkaline extract was subjected to GPC molecular weight analysis by the method described in Reference Example 1.

The analysis result is shown in FIG. 1. This analysis result confirms that the obtained lignin contained our low molecular weight lignin having a peak at a molecular weight of 7,000 and our high molecular weight lignin having a molecular weight peak at a molecular weight of 21,000. In addition, the number average molecular weight was 8,900. Furthermore, the amount of polyphenol in this bagasse alkaline hot-water extract was 0.2 wt % in terms of catechin, as measured in accordance with Reference Example 2. In addition, measurement of a coumaric acid and a ferulic acid by the method described in Reference Example 3 showed 0.08 wt % of coumaric acid and 0.016 wt % of ferulic acid, and the polyphenol content of the liquid containing only a coumaric acid and a ferulic acid at the same respective concentrations was 0.072 wt % in terms of catechin. This fact has revealed that the low molecular weight lignin and high molecular weight lignin existed at 0.128 wt % in terms of catechin.

Five frozen *Litopenaeus vannamei* shrimp (tradename: Myoko Yuki shrimp, produced by IMT Engineering Inc.), L size (about 15 g per shrimp), for which our food discoloration inhibitor was not used, were quickly thawed with cold water and dipped in 150 mL of the above-mentioned bagasse alkaline hot-water extract (30 mL per shrimp) for five minutes. After dipping, the shrimp were washed with tap water, wrapped in a wrap film, and stored at 4° C. for six days. State observations were carried out on Day 2 and Day 6 during the storage, and the ratio of the areas which turned brown was evaluated in an appearance test by six panelists. The discoloration was evaluated by visual observation at six grades in the following evaluation values from 0 to 10 (an average value of five shrimp) set in accordance with the method described in Nirmal, N. P. et al., *Food Chemistry*, 116, 323-331 (2009). 0: no brown, 2: a brown ratio of 0% or more and less than 20%, 4: a brown ratio of 20% or more and less than 40%, 6: a brown ratio of 40% or more and less than 60%, 8: a brown ratio of 60% or more and less than 80%, 10: a brown ratio of 80% or more and 100% or less. The measurement results and the averages of the panelists evaluation results are shown in Table 1.

Test Example 2 Discoloration Inhibition Effect on Shrimp (the Low Molecular Weight Lignin)

The bagasse alkaline hot-water extract prepared in Test Example 1 was neutralized to pH 3 with 6 N hydrochloric acid, followed by depositing our high molecular weight lignin. Diatomaceous earth at 1% was added to and mixed with the liquid, the resulting mixture was subjected to solid-liquid separation using a filter press (Model YTO, made by Yabuta Kikai Co., Ltd.), and the low molecular weight lignin liquid and the high molecular weight lignin were separated into the filtrate side and the solid content side respectively. The obtained filtrate was adjusted to pH 7 with 50% (wt/v) sodium hydroxide, and the resulting liquid was subjected to GPC molecular weight analysis by the method described in Reference Example 1. The GPC molecular weight analysis result is shown in FIG. 2. This analysis result confirms that the obtained lignin had the main peak from our low molecular weight lignin having a peak at a molecular weight of 7,000. In addition, the number average molecular weight determined from the GPC molecular weight analysis result was 4,000. Furthermore, the amount of polyphenol in this low molecular weight lignin was 0.1 wt % in terms of catechin, as measured in accordance with Reference Example 2. In addition, measurement of a coumaric acid and a ferulic acid by the method described in Reference Example 3 showed 0.06 wt % of coumaric acid and 0.012 wt % of ferulic acid, and the polyphenol content of the liquid containing only a coumaric acid and a ferulic acid at the same respective concentrations was 0.05 wt % in terms of catechin. This fact has revealed that the low molecular weight lignin existed 0.05 wt % in terms of catechin. The discoloration inhibition effect test was performed on shrimp using the same operation and conditions as in Test Example 1 except that our low molecular weight lignin liquid obtained in Test Example 2 was used. The measurement results and the averages of the panelist evaluation results are shown in Table 1.

Test Example 3 Discoloration Inhibition Effect on Shrimp (the High Molecular Weight Lignin)

To the solid content separated in Test Example 2, 50% (wt/v) of sodium hydroxide was added to adjust the pH to 12 and allow the high molecular weight lignin to dissolve. This high molecular weight lignin liquid was adjusted to pH 7 with 6 N hydrochloric acid, and the resulting liquid was subjected to GPC molecular weight analysis by the method described in Reference Example 1. The GPC molecular weight analysis result is shown in FIG. 3. This analysis result confirms that the obtained lignin was our high molecular weight lignin-having a peak at a molecular weight of 21,000, not containing our low molecular weight lignin. In addition, the number average molecular weight determined from this analysis result was 13,800. Furthermore, the amount of polyphenol in this high molecular weight lignin liquid was 0.1 wt % in terms of catechin, as measured in accordance with Reference Example 2. In addition, the liquid was measured for a coumaric acid and a ferulic acid by the method described in Reference Example 3, and neither coumaric acid nor ferulic acid was detected. The discoloration inhibition effect test was performed on shrimp using the same operation and conditions as in Test Example 1 except that our high molecular weight lignin liquid obtained in Test Example 3 was used. The measurement results and the averages of the panelist evaluation results are shown in Table 1.

Test Example 4 Discoloration Inhibition Effect on Shrimp (the Low Molecular Weight Lignin and the High Molecular Weight Lignin)

The bagasse alkaline hot-water extract in Test Example 1 was diluted two-fold with distilled water. The test was performed using the same operation and conditions as in Test Example 1 except that the obtained two-fold diluted bagasse alkaline hot-water extract was used. The measurement results and the averages of the panelist evaluation results are shown in Table 1.

Test Example 5 Discoloration Inhibition Effect on Shrimp (Water)

The discoloration inhibition effect test was performed on shrimp using tap water. The test was performed using the same operation and conditions as in Test Example 1 except that tap water was used. The measurement results and the averages of the panelist evaluation results are shown in Table 1.

These results confirm that tap water exhibits no discoloration inhibition effect.

Test Example 6 Discoloration Inhibition Effect on Shrimp (Sugar Cane Squeezed Juice)

Some sugar cane from which leaves had been removed were washed, crushed, and then squeezed while imbibition water (50° C. warm water) was added at a ratio of a sugar cane weight of 1 to an imbibition water weight of 19. The obtained juice was used to perform a discoloration inhibition effect test on shrimp. The test was performed using the same operation and conditions as in Test Example 1 except that the sugar cane squeezed juice was used. The measurement results and the averages of the panelist evaluation results are shown in Table 1.

Test Example 7 Discoloration Inhibition Effect on Shrimp (Bagasse Hydrothermal-Processing)

Figure 4:
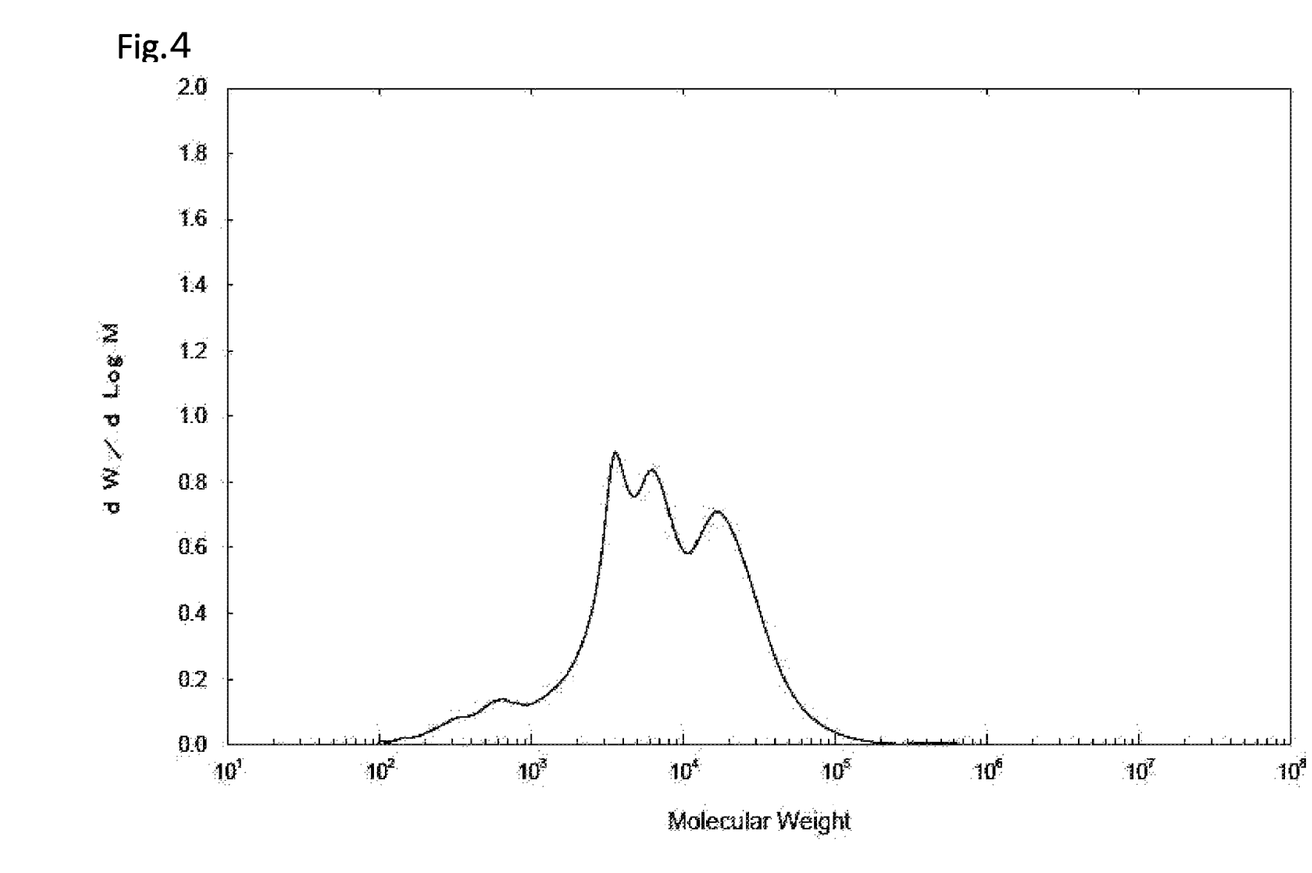
FIG. 4 shows a specific example of the GPC molecular weight analysis result of a bagasse hydrothermally-processed liquid.

Bagasse was adjusted to have a dry weight of 30 (wt/wt) % (a moisture content of 70%), and hydrothermally-processed (high pressure cooking-processed) under high pressure at 180° C. for ten minutes. The obtained bagasse hydrothermally-processed product was subjected to solid-liquid separation, and the obtained bagasse hydrothermally-processed liquid was adjusted to pH 7 with 1 N sodium hydroxide. Next, the resulting liquid was subjected to GPC molecular weight analysis by the method described in Reference Example 1. The result is shown in FIG. 4. This analysis result has revealed that the bagasse hydrothermally-processed liquid contained lignins having a molecular weight peak at a molecular weight of 3,200, a molecular weight of 6,000, and a molecular weight of 17,000 in peak order from higher to lower. In addition, the number average molecular weight determined from the GPC molecular weight analysis result was 2,870. The amount of polyphenol in this bagasse hydrothermally-processed liquid was 0.001 wt % in terms of catechin, as measured in accordance with Reference Example 2. Accordingly, the bagasse hydrothermally-processed liquid was found to contain almost no lignin having reducing power. In the bagasse hydrothermally-processed liquid, the effective ingredient having the highest peak had the peak at a molecular weight of 4,000 or less. This effective ingredient having the highest peak was different from our low molecular weight lignin and our high molecular weight lignin, but the composition of the ingredient included our low molecular weight lignin and our high molecular weight lignin. Furthermore, the liquid was measured for a coumaric acid and a ferulic acid by the method described in Reference Example 3, and neither coumaric acid nor ferulic acid was detected. In addition, the solid content of the bagasse hydrothermally-processed liquid was measured and found to be 2.5%.

The test was performed using the same operation and conditions as in Test Example 1 except that the shrimp were dipped in 150 mL of the bagasse hydrothermally-processed liquid for five minutes. The measurement results and the averages of the panelist evaluation results are shown in Table 1.

Test Example 8 Discoloration Inhibition Effect on Shrimp (Ferulic Acid)

A ferulic acid (purchased from Tokyo Chemical Industry Co., Ltd., having a purity of 98% or more and a molecular weight of 194) was adjusted to pH 7 with 4 N sodium hydroxide, and thus a ferulic acid liquid having 80 mg/L (0.008 wt %) of the acid was prepared. In addition, the amount of polyphenol in the ferulic acid liquid was 0.0064 wt % in terms of catechin, as measured in accordance with Reference Example 2. The test was performed using the same operation and conditions as in Test Example 1 except that the prepared ferulic acid liquid was used. The measurement results and the averages of the panelist evaluation results are shown in Table 1.

Test Example 9 Discoloration Inhibition Effect on Shrimp (Sodium Pyrosulfite)

A sodium pyrosulfite liquid was prepared to have 12.5 g/L (1.25 wt %) of sodium pyrosulfite (purchased from Nacalai Tesque, Inc., having a purity of 96% or more, otherwise known as sodium disulfite). The test was performed using the same operation and conditions as in Test Example 1 except that the prepared sodium pyrosulfite liquid was used. The measurement results and the averages of the panelist evaluation results are shown in Table 1.

Test Example 10 Discoloration Inhibition Effect on Shrimp (a Low Concentration of the Low Molecular Weight Lignin and the High Molecular Weight Lignin)

The bagasse alkaline hot-water extract in Test Example 1 was diluted four-fold with distilled water to prepare a diluted liquid. The test was performed using the same operation and conditions as in Test Example 1 except that the four-fold diluted liquid was used. The measurement results and the averages of the panelist evaluation results are shown in Table 1.

Test Example 11 Discoloration Inhibition Effect on Shrimp (High Concentration Ferulic Acid)

A ferulic acid (purchased from Tokyo Chemical Industry Co., Ltd., having a purity of 98% or more and a molecular weight of 194) was adjusted to pH 7 with 4 N sodium hydroxide, and thus a ferulic acid liquid having 1250 mg/L (0.125 wt %) of the acid was prepared. In addition, the amount of polyphenol in the ferulic acid liquid was 0.1 wt % in terms of catechin, as measured in accordance with Reference Example 2. The test was performed using the same operation and conditions as in Test Example 1 except that the prepared ferulic acid liquid was used. The measurement results and the averages of the panelist evaluation results are shown in Table 1.

TABLE 1

Discoloration Inhibition Effect on Shrimp

| | Composition of Antioxidant | | | | | | Evaluation Result | |
|---|---|---|---|---|---|---|---|---|
| | Presence of High Molecular Weight Lignin | Presence of Low Molecular Weight Lignin | Polyphenol Concentration of High Molecular Weight Lignin and/or Low Molecular Weight Lignin (wt % in terms of catechin) | Coumaric Acid (wt %) | Ferulic Acid (wt %) | Polyphenol Concentration (wt % in terms of catechin) | Brown (Day 2) | Brown (Day 6) |
| Test Example 1 | Yes | Yes | 0.128 | 0.08 | 0.016 | 0.2 | 0.8 | 2.0 |
| Test Example 2 | No | Yes | 0.05 | 0.06 | 0.012 | 0.1 | 0.8 | 2.4 |
| Test Example 3 | Yes | No | 0.1 | 0 | 0 | 0.1 | 0.8 | 2.6 |
| Test Example 4 | Yes | Yes | 0.064 | 0.04 | 0.008 | 0.1 | 0.8 | 2.4 |
| Test Example 5 | No | No | 0 | 0 | 0 | 0 | 2.0 | 4.8 |
| Test Example 6 | No | No | 0 | 0 | 0 | 0 | 2.0 | 4.4 |
| Test Example 7 | Yes | Yes | — | 0 | 0 | 0.001 | 1.6 | 4.4 |
| Test Example 8 | No | No | 0 | 0 | 0.008 | 0.006 | 1.4 | 3.6 |
| Test Example 9 | No | No | 0 | 0 | 0 | 0 | 0.8 | 2.8 |
| Test Example 10 | Yes | Yes | 0.032 | 0.02 | 0.004 | 0.05 | 1.4 | 3.6 |
| Test Example 11 | No | No | 0 | 0 | 0.125 | 0.1 | 1.4 | 3.4 |

The results in Table 1 revealed that, compared to the result in Test Example 5, the discoloration of the shrimp was remarkably inhibited in Test Examples 1 to 4, the conditions of which allowed the shrimp to be dipped in the solutions that contained our low molecular weight lignin and/or our high molecular weight lignin and had a polyphenol content of 0.05 wt % or more in terms of catechin, and that the conditions exhibited a high discoloration inhibition effect. The results also revealed that Test Examples 1 to 4 showed a discoloration inhibition effect on shrimp that was the same as or greater than the sodium pyrosulfite in Test Example 9 showed, and can be substituted for sulfite which is an existing food discoloration inhibitor. Furthermore, the comparison between Test Examples 2 to 4 and Test Example 11 revealed that the discoloration inhibition effect is not simply proportional to the polyphenol concentration of the liquid resulting from the dipping and, in addition, that the discoloration inhibition effect of the low molecular weight lignin and/or the high molecular weight lignin (Test Examples 1 to 4) is higher than that of the ferulic acid (Test Examples 8 and 11).

Test Example 12 Discoloration Inhibition Effect on Cabbage (the Low Molecular Weight Lignin and the High Molecular Weight Lignin)

The cut sides of a quarter cut cabbage were dipped in 30 mL of the bagasse alkaline hot-water extract prepared in Test Example 1 for five minutes. After dipping, the dipped parts of the cabbage were washed with tap water, wrapped in a wrap film, and stored at 4° C. for seven days. State observations were carried out on Day 2 and Day 7 during the storage, and the degree of discoloration on the cut sides of the cabbage was evaluated in an appearance test by panelists. The discoloration was evaluated by visual observation at the following grades from 0 to 10 (an average value of two pieces) in accordance with the method described in Nirmal, N. P. et al., *Food Chemistry*, 116, 323-331 (2009). 0: no brown, 2: a brown ratio of 0% or more and less than 20%, 4: a brown ratio of 20% or more and less than 40%, 6: a brown ratio of 40% or more and less than 60%, 8: a brown ratio of 60% or more and less than 80%, 10: a brown ratio of 80% or more and 100% or less. The results are shown in Table 2.

Test Example 13 Discoloration Inhibition Effect on Cabbage (the Low Molecular Weight Lignin)

The test was performed using the same operation and conditions as in Test Example 12 except that our low molecular weight lignin liquid which was the same as in Test Example 2 was used. The averages of the results are shown in Table 2.

Test Example 14 Discoloration Inhibition Effect on Cabbage (the High Molecular Weight Lignin)

The test was performed using the same operation and conditions as in Test Example 12 except that our high molecular weight lignin liquid obtained in Test Example 3 was used. The results are shown in Table 2.

Test Example 15 Discoloration Inhibition Effect on Cabbage (Water)

The test was performed using the same operation and conditions as in Test Example 12 except that tap water was used. The results are shown in Table 2.

Test Example 16 Discoloration Inhibition Effect on Cabbage (Sugar Cane Squeezed Juice)

The test was performed using the same operation and conditions as in Test Example 12 except that the sugar cane squeezed juice in Test Example 6 was used. The results are shown in Table 2.

Test Example 17 Discoloration Inhibition Effect on Cabbage (Bagasse Hydrothermal-Processing)

The test was performed using the same operation and conditions as in Test Example 12 except that the bagasse hydrothermally-processed liquid in Test Example 7 was used. The results are shown in Table 2.

Test Example 18 Discoloration Inhibition Effect on Cabbage (Ferulic Acid)

The test was performed using the same operation and conditions as in Test Example 12 except that the ferulic acid liquid in Test Example 8 was used. The measurement results and the panelist evaluation results are shown in Table 2.

Test Example 19 Discoloration Inhibition Effect on Cabbage (Sodium Pyrosulfite)

The test was performed using the same operation and conditions as in Test Example 12 except that the sodium pyrosulfite liquid in Test Example 9 was used. The results are shown in Table 2.

molecular weight lignin liquid in Test Example 2 was used. The results are shown in Table 3.

Test Example 22 Discoloration Inhibition Effect on Minced Meat (the High Molecular Weight Lignin)

The test was performed using the same operation and conditions as in Test Example 20 except that our high molecular weight lignin liquid in Test Example 3 was used. The results are shown in Table 3.

TABLE 2

Discoloration Inhibition Effect on Cabbage

| | Composition of Antioxidant | | | | | | Evaluation Result | |
|---|---|---|---|---|---|---|---|---|
| | Presence of High Molecular Weight Lignin | Presence of Low Molecular Weight Lignin | Polyphenol Concentration of High Molecular Weight Lignin and/or Low Molecular Weight Lignin (wt % in terms of catechin) | Coumaric Acid (wt %) | Ferulic Acid (wt %) | Polyphenol Concentration (wt % in terms of catechin) | Brown (Day 2) | Brown (Day 7) |
| Test Example 12 | Yes | Yes | 0.128 | 0.08 | 0.016 | 0.2 | 0 | 2 |
| Test Example 13 | No | Yes | 0.05 | 0.06 | 0.012 | 0.1 | 0 | 2 |
| Test Example 14 | Yes | No | 0.1 | 0 | 0 | 0.1 | 0 | 2 |
| Test Example 15 | No | No | 0 | 0 | 0 | 0 | 2 | 6 |
| Test Example 16 | No | No | 0 | 0 | 0 | 0 | 2 | 6 |
| Test Example 17 | Yes | Yes | — | 0 | 0 | 0.001 | 2 | 4 |
| Test Example 18 | No | No | 0 | 0 | 0.008 | 0.006 | 2 | 6 |
| Test Example 19 | No | No | 0 | 0 | 0 | 0 | 0 | 2 |

The results in Table 2 revealed that, compared to the result in Test Example 15, the discoloration of the cabbages was inhibited in Test Examples 12 to 14 which allowed the cabbages to be dipped in the solutions that contained our low molecular weight lignin and/or our high molecular weight lignin and had a polyphenol content of 0.05 wt % or more in terms of catechin, and that the solutions exhibited a high discoloration inhibition effect. The results also revealed that the discoloration inhibition action on cabbages in Test Examples 12 to 14 was the same discoloration inhibition action as the sodium pyrosulfite in Test Example 19 showed, and that the food discoloration inhibitor can be a substitute for sulfite which is an existing food discoloration inhibitor.

Test Example 20 Discoloration Inhibition Effect on Minced Meat (the Low Molecular Weight Lignin and the High Molecular Weight Lignin)

Minced beef and pork mixed meat in an amount of 60 g was dipped in 30 mL of the bagasse alkaline hot-water extract prepared in Test Example 1 for five minutes. After dipping, the dipped parts were washed with tap water, wrapped in a wrap film, and stored at 4° C. State observations were carried out on Days 0 to 5, and the degree of discoloration was evaluated by visual observation in an appearance test by six panelists. The discoloration was evaluated by visual observation at the following grades from 0 to 10 (an average value of two specimens). 0: no brown, 2: a brown ratio of 0% or more and less than 20%, 4: a brown ratio of 20% or more and less than 40%, 6: a brown ratio of 40% or more and less than 60%, 8: a brown ratio of 60% or more and less than 80%, 10: a brown ratio of 80% or more and 100% or less. The results are shown in Table 3.

Test Example 21 Discoloration Inhibition Effect on Minced Meat (the Low Molecular Weight Lignin)

The test was performed using the same operation and conditions as in Test Example 20 except that our low Test Example 23 Discoloration Inhibition Effect on Minced Meat (Water)

The test was performed using the same operation and conditions as in Test Example 20 except that tap water was used. The results are shown in Table 3.

Test Example 24 Discoloration Inhibition Effect on Minced Meat (Sugar Cane Squeezed Juice)

The test was performed using the same operation and conditions as in Test Example 20 except that the sugar cane squeezed juice in Test Example 6 was used. The results are shown in Table 3.

Test Example 25 Discoloration Inhibition Effect on Minced Meat (Bagasse Hydrothermal-Processing)

The test was performed using the same operation and conditions as in Test Example 20 except that the bagasse hydrothermally-processed liquid in Test Example 7 was used. The results are shown in Table 3.

Test Example 26 Discoloration Inhibition Effect on Minced Meat (Ferulic Acid)

The test was performed using the same operation and conditions as in Test Example 20 except that the ferulic acid liquid in Test Example 8 was used. The results are shown in Table 3.

Test Example 27 Discoloration Inhibition Effect on Minced Meat (Sodium Pyrosulfite)

The test was performed using the same operation and conditions as in Test Example 20 except that the sodium pyrosulfite liquid in Test Example 9 was used. The results are shown in Table 3.

TABLE 3

Discoloration Inhibition Effect on Minced Meat

| | Composition of Antioxidant | | | | | | Evaluation Result | |
|---|---|---|---|---|---|---|---|---|
| | Presence of High Molecular Weight Lignin | Presence of Low Molecular Weight Lignin | Polyphenol Concentration of High Molecular Weight Lignin and/or Low Molecular Weight Lignin (wt % in terms of catechin) | Coumaric Acid (wt %) | Ferulic Acid (wt %) | Polyphenol Concentration (wt % in terms of catechin) | Brown (Day 2) | Brown (Day 5) |
| Test Example 20 | Yes | Yes | 0.128 | 0.08 | 0.016 | 0.2 | 0 | 2 |
| Test Example 21 | No | Yes | 0.05 | 0.06 | 0.012 | 0.1 | 0 | 4 |
| Test Example 22 | Yes | No | 0.1 | 0 | 0 | 0.1 | 0 | 4 |
| Test Example 23 | No | No | 0 | 0 | 0 | 0 | 2 | 6 |
| Test Example 24 | No | No | 0 | 0 | 0 | 0 | 2 | 6 |
| Test Example 25 | Yes | Yes | — | 0 | 0 | 0.001 | 2 | 6 |
| Test Example 26 | No | No | 0 | 0 | 0.008 | 0.006 | 0 | 6 |
| Test Example 27 | No | No | 0 | 0 | 0 | 0 | 0 | 4 |

The results in Table 3 revealed that, compared to the result in Test Example 23, the discoloration of the minced meat was inhibited in Test Examples 20 to 22 which allowed the minced meat to be dipped in the solutions that contained our low molecular weight lignin and/or our high molecular weight lignin and had a polyphenol content of 0.05 wt % or more in terms of catechin, and that the solutions exhibited a high discoloration inhibition effect. The results also revealed that the discoloration inhibition action on minced meat in Test Examples 20 to 22 was the same discoloration inhibition action as the sodium pyrosulfite in Test Example 27 showed, and that the food discoloration inhibitor can be a substitute for sulfite which is an existing food discoloration inhibitor.

Test Example 28 Discoloration Inhibition Effect on Yellowfin Tuna (the Low Molecular Weight Lignin and the High Molecular Weight Lignin)

Yellowfin tuna in an amount of about 80±10 g (purchased from Fresh Deli Tamaya) was dipped in 15 mL of the bagasse alkaline hot-water extract prepared in Test Example 1 for five minutes. After dipping, the dipped parts were washed with tap water, wrapped in a wrap film, and stored at 4° C. State observations were carried out on Days 0 to 5, and the degree of discoloration was evaluated in an appearance test by six panelists. The discoloration was evaluated by visual observation at the following grades from 0 to 10 (an average value of two specimens) in accordance with the method described in Nirmal, N. P. et al., *Food Chemistry*, 116, 323-331 (2009). 0: no brown, 2: a brown ratio of 0% or more and less than 20%, 4: a brown ratio of 20% or more and less than 40%, 6: a brown ratio of 40% or more and less than 60%, 8: a brown ratio of 60% or more and less than 80%, 10: a brown ratio of 80% or more and 100% or less. The results are shown in Table 4.

Test Example 29 Discoloration Inhibition Effect on Yellowfin Tuna (the Low Molecular Weight Lignin)

The test was performed using the same operation and conditions as in Test Example 28 except that our low molecular weight lignin liquid in Test Example 2 was used. The results are shown in Table 4.

Test Example 30 Discoloration Inhibition Effect on Yellowfin Tuna (the High Molecular Weight Lignin)

The test was performed using the same operation and conditions as in Test Example 28 except that our high molecular weight lignin liquid in Test Example 3 was used. The results are shown in Table 4.

Test Example 31 Discoloration Inhibition Effect on Yellowfin Tuna (Water)

The test was performed using the same operation and conditions as in Test Example 28 except that tap water was used. The results are shown in Table 4.

Test Example 32 Discoloration Inhibition Effect on Yellowfin Tuna (Sugar Cane Squeezed Juice)

The test was performed using the same operation and conditions as in Test Example 28 except that the sugar cane squeezed juice in Test Example 6 was used. The results are shown in Table 4.

Test Example 33 Discoloration Inhibition Effect on Yellowfin Tuna (Bagasse Hydrothermal-Processing)

The test was performed using the same operation and conditions as in Test Example 28 except that the bagasse hydrothermally-processed liquid in Test Example 7 was used. The results are shown in Table 4.

Test Example 34 Discoloration Inhibition Effect on Yellowfin Tuna (Ferulic Acid)

The test was performed using the same operation and conditions as in Test Example 28 except that the ferulic acid liquid in Test Example 8 was used. The results are shown in Table 4.

Test Example 35 Discoloration Inhibition Effect on Yellowfin Tuna (Sodium Pyrosulfite)

The test was performed in the same manner as in Test Example 28 except that the sodium pyrosulfite liquid in Test Example 9 was used. The results are shown in Table 4.

TABLE 4

Discoloration Inhibition Effect on Yellowfin Tuna

| | Composition of Antioxidant | | | | | | Evaluation Result | |
|---|---|---|---|---|---|---|---|---|
| | Presence of High Molecular Weight Lignin | Presence of Low Molecular Weight Lignin | Polyphenol Concentration of High Molecular Weight Lignin and/or Low Molecular Weight Lignin (wt % in terms of catechin) | Coumaric Acid (wt %) | Ferulic Acid (wt %) | Polyphenol Concentration (wt % in terms of catechin) | Brown (Day 2) | Brown (Day 5) |
| Test Example 28 | Yes | Yes | 0.128 | 0.08 | 0.016 | 0.2 | 0 | 2 |
| Test Example 29 | No | Yes | 0.05 | 0.06 | 0.012 | 0.1 | 0 | 2 |
| Test Example 30 | Yes | No | 0.1 | 0 | 0 | 0.1 | 0 | 2 |
| Test Example 31 | No | No | 0 | 0 | 0 | 0 | 2 | 4 |
| Test Example 32 | No | No | 0 | 0 | 0 | 0 | 2 | 4 |
| Test Example 33 | Yes | Yes | — | 0 | 0 | 0.001 | 2 | 4 |
| Test Example 34 | No | No | 0 | 0 | 0.008 | 0.006 | 2 | 4 |
| Test Example 35 | No | No | 0 | 0 | 0 | 0 | 0 | 2 |

The results in Table 4 revealed that, compared to the result in Test Example 31, the discoloration of the yellowfin tuna was inhibited in Test Examples 28 to 30 which allowed the yellowfin tuna to be dipped in the solutions that contained our low molecular weight lignin and/or our high molecular weight lignin and had a polyphenol content of 0.05 wt % or more in terms of catechin, and that the solutions exhibited a high discoloration inhibition effect. The results revealed that the discoloration inhibition action on yellowfin tuna in Test Examples 28 to 30 was the same discoloration inhibition action as the sodium pyrosulfite in Test Example 35 showed, and that the food discoloration inhibitor can be a substitute for sulfite which is an existing food discoloration inhibitor.

Test Example 36 Discoloration Inhibition Effect on Apple (the Low Molecular Weight Lignin and the High Molecular Weight Lignin)

The cut side of a half-cut apple was dipped in 15 mL of the bagasse alkaline hot-water extract prepared in Test Example 1 for five minutes. After dipping, the dipped parts were washed with tap water, wrapped in a wrap film, and stored at 4° C. State observations were carried out on Days 0 to 1, and the degree of discoloration was evaluated in an appearance test by six panelists. The discoloration was evaluated by visual observation at the following grades from 0 to 10 (an average value of two specimens) in accordance with the method described in Nirmal, N. P. et al., *Food Chemistry*, 116, 323-331 (2009). 0: no brown, 2: a brown ratio of 0% or more and less than 20%, 4: a brown ratio of 20% or more and less than 40%, 6: a brown ratio of 40% or more and less than 60%, 8: a brown ratio of 60% or more and less than 80%, 10: a brown ratio of 80% or more and 100% or less. The results are shown in Table 5.

Test Example 37 Discoloration Inhibition Effect on Apple (the Low Molecular Weight Lignin)

The test was performed using the same operation and conditions as in Test Example 36 except that our low molecular weight lignin liquid in Test Example 2 was used. The results are shown in Table 5.

Test Example 38 Discoloration Inhibition Effect on Apple (the High Molecular Weight Lignin)

The test was performed using the same operation and conditions as in Test Example 36 except that our high molecular weight lignin liquid in Test Example 3 was used. The results are shown in Table 5.

Test Example 39 Discoloration Inhibition Effect on Apple (Water)

The test was performed using the same operation and conditions as in Test Example 36 except that the tap water in Test Example 5 was used. The results are shown in Table 5.

Test Example 40 Discoloration Inhibition Effect on Apple (Sugar Cane Squeezed Juice)

The test was performed using the same operation and conditions as in Test Example 36 except that the sugar cane squeezed juice in Test Example 6 was used. The results are shown in Table 5.

Test Example 41 Discoloration Inhibition Effect on Apple (Bagasse Hydrothermal-Processing)

The test was performed using the same operation and conditions as in Test Example 36 except that the bagasse hydrothermally-processed liquid in Test Example 7 was used. The results are shown in Table 5.

Test Example 42 Discoloration Inhibition Effect on Apple (Ferulic Acid)

The test was performed using the same operation and conditions as in Test Example 36 except that the ferulic acid liquid in Test Example 8 was used. The results are shown in Table 5.

Test Example 43 Discoloration Inhibition Effect on Apple (Sodium Pyrosulfite)

The test was performed using the same operation and conditions as in Test Example 36 except that the sodium pyrosulfite liquid in Test Example 9 was used. The results are shown in Table 5.

TABLE 5

Discoloration Inhibition Effect on Apple

| | Composition of Antioxidant | | | | | | Evaluation Result | |
|---|---|---|---|---|---|---|---|---|
| | Presence of High Molecular Weight Lignin | Presence of Low Molecular Weight Lignin | Polyphenol Concentration of High Molecular Weight Lignin and/or Low Molecular Weight Lignin (wt % in terms of catechin) | Coumaric Acid (wt %) | Ferulic Acid (wt %) | Polyphenol Concentration (wt % in terms of catechin) | Brown (Hour 12) | Brown (Hour 24) |
| Test Example 36 | Yes | Yes | 0.128 | 0.08 | 0.016 | 0.2 | 0 | 2 |
| Test Example 37 | No | Yes | 0.05 | 0.06 | 0.012 | 0.1 | 2 | 2 |
| Test Example 38 | Yes | No | 0.1 | 0 | 0 | 0.1 | 2 | 2 |
| Test Example 39 | No | No | 0 | 0 | 0 | 0 | 6 | 8 |
| Test Example 40 | No | No | 0 | 0 | 0 | 0 | 4 | 8 |
| Test Example 41 | Yes | Yes | — | 0 | 0 | 0.001 | 4 | 8 |
| Test Example 42 | No | No | 0 | 0 | 0.008 | 0.006 | 6 | 8 |
| Test Example 43 | No | No | 0 | 0 | 0 | 0 | 2 | 4 |

The results in Table 5 revealed that, compared to the result in Test Example 39, the discoloration of the apple was inhibited in Test Examples 36 to 38 which allowed the apple to be dipped in the solutions that contained our low molecular weight lignin and/or our high molecular weight lignin and had a polyphenol content of 0.05 wt % or more in terms of catechin, and that the solutions exhibited a high discoloration inhibition effect. The results revealed that the discoloration inhibition action on apple in Test Examples 36 to 38 was the same as or greater than the discoloration inhibition effect which the sodium pyrosulfite in Test Example 43 showed, and that the food discoloration inhibitor can be a substitute for sulfite which is an existing food discoloration inhibitor.

Test Example 44 Discoloration Inhibition Effect on Shrimp (Lignin Having a Molecular Weight Peak in a Molecular Weight Range of More than 40,000, Wherein the Molecular Weight Peak is Measured at a Wavelength of 254 nm by GPC Molecular Weight Analysis Using an UV Detector)

Figure 5:
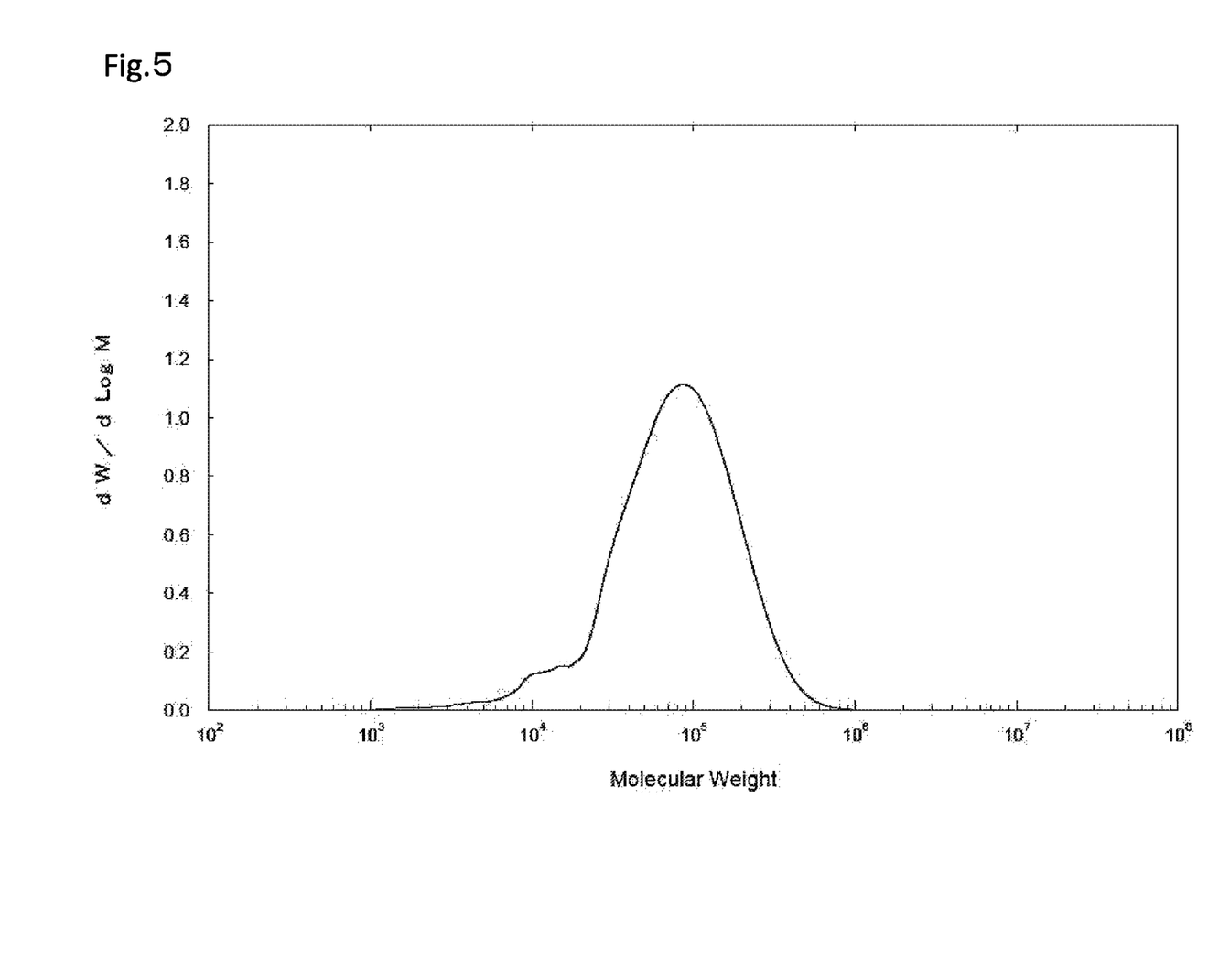
FIG. 5 shows a specific example of the GPC molecular weight analysis result of a lignosulfonic acid liquid.

A lignosulfonic acid liquid (a solution of 3% SAN-X P252, made by Nippon Paper Chemicals Co., Ltd., dissolved in an aqueous solution adjusted to pH 10 with NaOH) was subjected to GPC molecular weight analysis by the method described in Reference Example 1. The result is shown in FIG. 5. This analysis result of the lignosulfonic acid liquid confirms that the obtained lignin contained a lignin having a peak at a molecular weight of 100,000. In addition, the number average molecular weight was 39,000. Furthermore, the amount of polyphenol in this bagasse alkaline hot-water extract was 0.1 wt % in terms of catechin, as measured in accordance with Reference Example 2. The discoloration inhibition effect test was performed on shrimp using the liquid further adjusted to pH 7 with 6 N hydrochloric acid. The test was performed using the same operation and conditions as in Test Example 1 except that the lignosulfonic acid liquid was used. The measurement results and the averages of the panelist evaluation results are shown in Table 6.

Test Example 45 Discoloration Inhibition Effect on Shrimp (Lignin Having a Molecular Weight Peak in a Molecular Weight Range of Less than 4,000, Wherein the Molecular Weight Peak is Measured at a Wavelength of 254 nm by GPC Molecular Weight Analysis Using an UV Detector)

Figure 6:
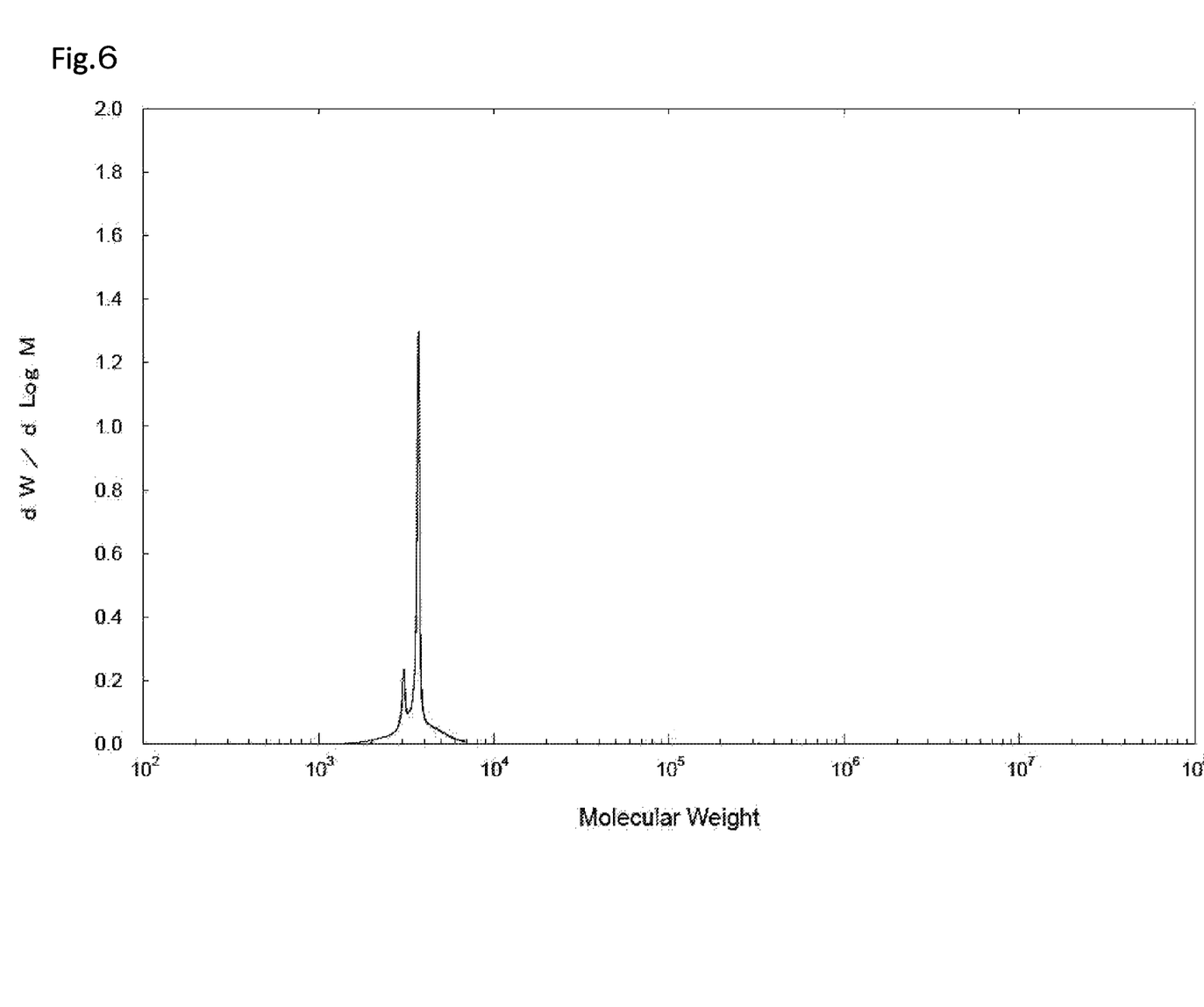
FIG. 6 shows a specific example of the GPC molecular weight analysis result of an alkaline hydrothermally-processed liquid.

Bagasse in an amount of 1 kg (purchased from Taito Nosan K. K., produced in Vietnam) at 5 wt % by dry weight was added to and mixed with a 0.6 (wt/wt) % sodium hydroxide aqueous solution, the resulting mixture was allowed to react at 180° C. for five minutes, and adjusted to pH 7 with 6 N hydrochloric acid, and then, the solid was separated through a sieve, and filtrated through an MF film (tradename: TREFIL HFS Type, made by Toray Industries, Inc.) to prepare a bagasse alkaline hydrothermally-processed liquid. This alkaline hydrothermally-processed liquid was subjected to GPC molecular weight analysis by the method described in Reference Example 1. The analysis result is shown in FIG. 6. This analysis result confirms that the obtained lignin contained a lignin having a peak at a molecular weight of 3,700. In addition, the number average molecular weight was 3,300. This bagasse alkaline hydrothermally-processed liquid was neutralized to pH 7 with 6 N hydrochloric acid, and concentrated three-fold (v/v) under reduced pressure. The polyphenol content of the three-fold concentrated bagasse alkaline hydrothermally-processed liquid was measured in accordance with Reference Example 2 and found to be 0.1 wt % in terms of catechin. The test was performed using the same operation and conditions as in Test Example 1 except that the three-fold concentrated bagasse alkaline hydrothermally-processed liquid was used. The measurement results and the averages of the panelist evaluation results are shown in Table 6.

Test Example 46 Discoloration Inhibition Effect on Shrimp (Bagasse Hydrothermal-Processing)

The bagasse hydrothermally-processed liquid obtained in Test Example 7 was dried under reduced pressure at 40° C. until the weight did not change any more, and the solid content of the resulting product was measured and found to be 3.3%. The polyphenol amount measured before the drying was 0.001 wt % in terms of catechin, and accordingly the solid content was calculated at 0.03 wt % in terms of catechin.

The test was performed in the same manner as in Test Example 1 except that the shrimp were dredged with 5 g of the solid content of the bagasse hydrothermally-processed liquid for five minutes. The measurement results and the averages of the panelist evaluation results are shown in Table 6.

From the results in Table 6, the comparison between Test Examples 2 to 4 and Test Examples 44 and 45 has revealed that, even at the same polyphenol concentration of 0.1%, the lignins having a molecular weight peak at a molecular weight of more than 40,000 or less than 4,000 had a lower discoloration inhibition effect on shrimp, wherein the molecular weight peak was measured at a wavelength of 254 nm by GPC molecular weight analysis using an UV detector.

TABLE 6

Discoloration Inhibition Effect on Shrimp

| | Composition of Antioxidant | | | | | | Evaluation Result | |
|---|---|---|---|---|---|---|---|---|
| | Presence of High Molecular Weight Lignin | Presence of Low Molecular Weight Lignin | Polyphenol Concentration of Lignin Having Molecular Weight Peak at Molecular Weight of 40,000 or more or 4,000 or less at Wavelength of 254 nm in GPC Molecular Weight Analysis Using UV Detector (wt % in terms of catechin) | Coumaric Acid (wt %) | Ferulic Acid (wt %) | Polyphenol Concentration (wt % in terms of catechin) | Brown (Day 2) | Brown (Day 6) |
| Test Example 44 | No | No | 0.1 | 0 | 0 | 0.1 | 1.6 | 4.4 |
| Test Example 45 | No | No | 0.1 | 0 | 0 | 0.1 | 1.6 | 4.0 |
| Test Example 46 | Yes | Yes | — | 0 | 0 | 0.03 | 1.6 | 4.4 |

The invention claimed is:

1. A method of inhibiting food discoloration, comprising bringing in contact with a food a food discoloration inhibitor, comprising, as an effective ingredient, a low molecular weight lignin having a molecular weight peak in a molecular weight range of 4,000 to 9,500 and/or a high molecular weight lignin having a molecular weight peak in a molecular weight range of 10,000 to 40,000, wherein said molecular weight peak is measured at a wavelength of 254 nm by GPC molecular weight analysis using an UV detector.

2. A method of inhibiting food discoloration, comprising bringing in contact with a food the food discoloration inhibitor according to claim 1, comprising, as an effective ingredient, a composition containing said low molecular weight lignin and/or said high molecular weight lignin, wherein the lignin(s) content, as a polyphenol amount, calculated using Folin-Chiocalteu method, is 0.05 wt % or more in terms of catechin.

3. A method of inhibiting food discoloration, comprising bringing in contact with a food the food discoloration inhibitor according to claim 2, comprising, as an effective ingredient, said composition further containing a coumaric acid and/or a ferulic acid.

4. A method of inhibiting food discoloration, comprising bringing in contact with a food the food discoloration inhibitor according to claim 2, wherein said composition is a bagasse alkaline hot-water extract.

5. A method of inhibiting food discoloration, comprising bringing in contact with a food the food discoloration inhibitor according to claim 1, wherein the food is a fresh food.

6. A method of inhibiting food discoloration, comprising bringing in contact with a food the food discoloration inhibitor according to claim 5, wherein said fresh food is an aquatic organism.

7. A method of inhibiting food discoloration, comprising bringing in contact with a food the food discoloration inhibitor according to claim 6, wherein said aquatic organism is a crustacean.

8. A method of inhibiting food discoloration, comprising bringing in contact with a food the food discoloration inhibitor according to claim 7, wherein said crustacean is a prawn.

* * * * *